Dec. 8, 1959 A. F. BOSCIA 2,916,616
REFLEX AMPLIFIER-DETECTOR STAGE
Filed Nov. 19, 1956
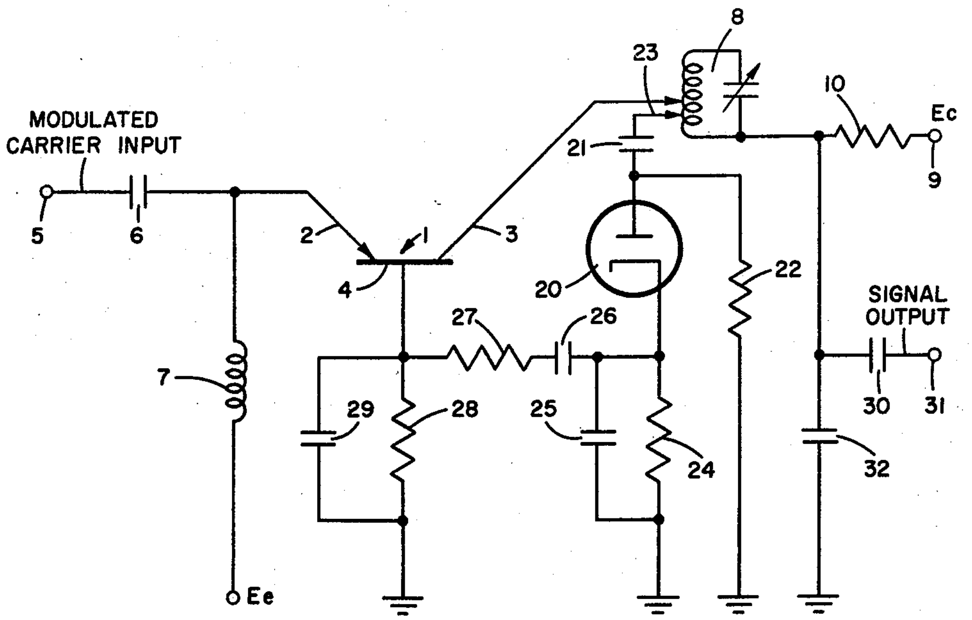
INVENTOR.
ARCHIE F. BOSCIA
BY T. L. Stymer
ATTORNEY 2,916,616
Patented Dec. 8, 1959

2,916,616

REFLEX AMPLIFIER-DETECTOR STAGE

Archie F. Boscia, Rochester, N.Y., assignor to General Dynamics Corporation, Rochester, N.Y., a corporation of Delaware Application November 19, 1956, Serial No. 623,132

1 Claim. (Cl. 250—20)

This invention relates to high gain detectors and is particularly directed to means for detecting the signal of a modulated carrier wave, with particular emphasis on the advantageous use of transistors.

Reflex circuits of various types usually feed back radio frequency energy from the output circuit to the input circuit of an amplifier. Such circuits have the well known disadvantage of bursting into oscillations as tuning adjustments are made. On the other hand, feeding back only signal voltages has met with no greater success. Because of the nonlinearity of the grid voltage-anode current characteristic of the usual evacuated grid-controlled amplifier tube, signal distortion rapidly mounts with increased signal volume.

The object of this invention is to provide an improved regenerative detector for signals modulated on a carrier.

The object of this invention is attained by amplifying the modulated signal in a transistor type amplifier, then detecting and separating the signal frequency components from the carrier frequency components, and finally feeding back for reamplification only the signal components to one of the control electrodes of the transistor. It has been found that transistors of either the n-p-n or p-n-p type are admirably adapted to the circuits of this invention.

Other objects and features of this invention will become apparent to those skilled in the art by referring to the specific embodiment described in the following specification, defined in the attached claim, and shown in the accompanying drawing in which The single figure of the drawing is a circuit diagram of the one embodiment of this invention.

The transistor 1 shown in the drawing is of the p-n-p type having an emitter 2, collector 3, and base 4. The input terminal 5, representing any source of modulated carrier, is coupled to one input electrode of the transistor which in the example shown is the emitter 2, through the conventional coupling capacitor 6, the proper bias, $E_e$, being applied to the emitter through the radio frequency choke coil 7. The output of the transistor, including the collector 3, is coupled to any tunable resonant frequency circuit, such as the tank circuit 8, for selectively accepting the desired carrier applied to the input 5. Conveniently, the coupling may be made to a tap at an intermediate point on the coil of the tank circuit. Series resonant tuning could be employed, if desired, as long as the parameters of the resonant circuit and placement of the tap are selected to properly load the output circuit of the transistor. Further loading and bias for the collector 3 is obtained through load resistor 10 from a direct current source at 9.

Detection of the signals modulated on the carrier is effected by the rectifier 20, which may be of the semiconductor type, or of the evacuated anode-cathode type, as shown. Coupling to the rectifier is made through the coupling capacitor 21 and the load resistor 22. Energy in the tank circuit 8 is conveniently sampled at the tap 23 on the tank coil 8, the impedances of the tank tap and coupling circuit 21—22 being easily matched. The radio frequency signal voltage appearing across load resistor 22 is applied to the anode of the detector 20 and hence across the detector load resistor 24. The usual R.-F. bypass condenser 25 is placed across the load resistor 24. The detected signal across load resistor 24, substantially free of R.-F. components, is applied to the other input or control electrode of the transistor, namely the base 4 in the specific example illustrated.

According to an important feature of this invention, the base 4 is removed from ground and is driven by the detected signal voltage applied through coupling condenser 26 and coupling resistor 27 to the base-end of the base load resistor 28. The ohmic size of load resistor 28 is selected to give optimum transfer of signal energy from the detector to the base. Now, across the load resistor 28 is placed the condenser 29 which, according to this invention, presents low impedance to the applied high-frequency modulated carrier at input terminal 5 and yet presents a high impedance to the low-frequency signal component arriving from the detectors 20—24. Hence, almost the entire carrier voltage appears across the emitter-base terminals 2—4 of the transistor while the fed-back signal energy is efficiently applied to the base. The transistor now becomes an efficient radio frequency amplifier as well as an efficient signal frequency amplifier. If voice modulated signals in the broadcast band are to be detected, condenser 29 should be about 270 mmf.

Since the high-frequency components are carefully eliminated from the feedback circuit, ringing or self-oscillation is positively prevented while at the same time permitting high regenerative amplification of signal frequency. Because of the linear base-to-collector voltage characteristics, distortion is not introduced by imposing high collector currents on the transistor. This is to be distinguished from the distortions caused by the nonlinear anode characteristics of a vacuum tube. The regeneratively amplified modulation frequencies are connected through the coupling capacitor 30 to the output terminal 31. Any R.-F. components appearing in the output signal are grounded through the bypass condenser 32.

Since many modifications may be made in the circuit here described without departing from the teaching of this disclosure, the specific example above-described is to be taken as illustrative only. For example, the transistor 1 shown could be replaced by a n-p-n type junction transistor with the expected adjustments of the biasing voltages at 7 and 9. Further, many types of signal frequency couplings could be employed in the feed back circuit between the detector 20 and the control electrode or base 4.

What is claimed is:

An amplifier-detector system for signal modulated radio frequencies comprising an amplifier device having a control electrode, an output electrode and a common electrode, said common electrode being connected to reference ground through a coupling impedance network, said network having low impedance for said radio frequencies and having high impedance for signals of low frequencies, an input terminal being coupled to said control electrode to drive said control electrode at said high frequencies; a tunable resonant tank circuit, including inductance and capacity, coupled at one end to ground through a low frequency impedance coupling circuit, said output electrode being connected to a tap on said inductance, the placement of said tap being selected to properly load the output circuit of said amplifier device at radio frequencies, a demodulating circuit comprising a rectifier, said rectifier being coupled between a second tap on said inductance and reference ground, the placement of said second tap being selected to properly match the impedance at signal frequencies of said demodulating circuit, said demodulating circuit being coupled across said impedance network to drive said common electrode at said low frequency, and an output circuit for the detected and amplified low frequencies connected to said low frequency impedance coupling circuit.

References Cited in the file of this patent

UNITED STATES PATENTS

| | | |
|---|---|---|
| 1,709,062 | Cohen | Apr. 16, 1929 |
| 2,205,243 | Dome | June 18, 1940 |
| 2,771,584 | Thomas | Nov. 20, 1956 |
| 2,786,964 | Witt et al. | Mar. 26, 1957 |